United States Patent [19]

Kroll et al.

[11] Patent Number: 5,228,527

[45] Date of Patent: Jul. 20, 1993

[54] FORCE MEASUREMENT ASSEMBLY

[75] Inventors: William P. Kroll, Medina; Robert E. K. Kroll, Plymouth; Kai K. K. Kroll, Minnetonka, all of Minn.

[73] Assignee: Intercomp Company, Minneapolis, Minn.

[21] Appl. No.: 800,614

[22] Filed: Nov. 27, 1991

[51] Int. Cl.⁵ .......................... G01G 3/14; G01L 1/22
[52] U.S. Cl. ...................... 177/211; 73/862.627
[58] Field of Search ................. 177/211; 73/862.627

[56] References Cited

U.S. PATENT DOCUMENTS

| | | | |
|---|---|---|---|
| 4,666,003 | 5/1987 | Reichow | 177/211 X |
| 4,775,018 | 10/1988 | Kroll et al. | 177/134 |
| 4,813,504 | 3/1989 | Kroll | 177/211 |

*Primary Examiner*—George H. Miller, Jr.
*Attorney, Agent, or Firm*—Joel D. Skinner; Anthony G. Eggink

[57] ABSTRACT

A double ended shear beam load cell assembly providing a structural weight bearing component for a portable, low profile weighing scale. The load cell has an elongated rectilinear beam structure with a pair of aligned and laterally opposing apertures which define internal, spacially parallel end walls adjacent the ends of the beam. Strain gauges are mounted in a predetermined orientation on the aperture end walls of the beam. Top and bottom brace plate members and a spacer plate are mounted to the central portion of the beam. The load cell beam ends are further provided with structure for mounting in a weighing scale base.

14 Claims, 6 Drawing Sheets

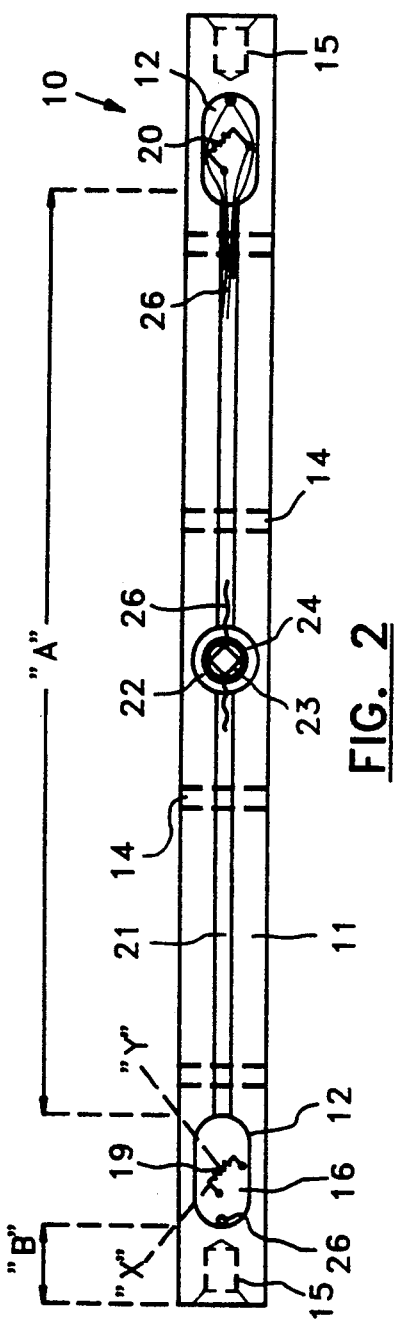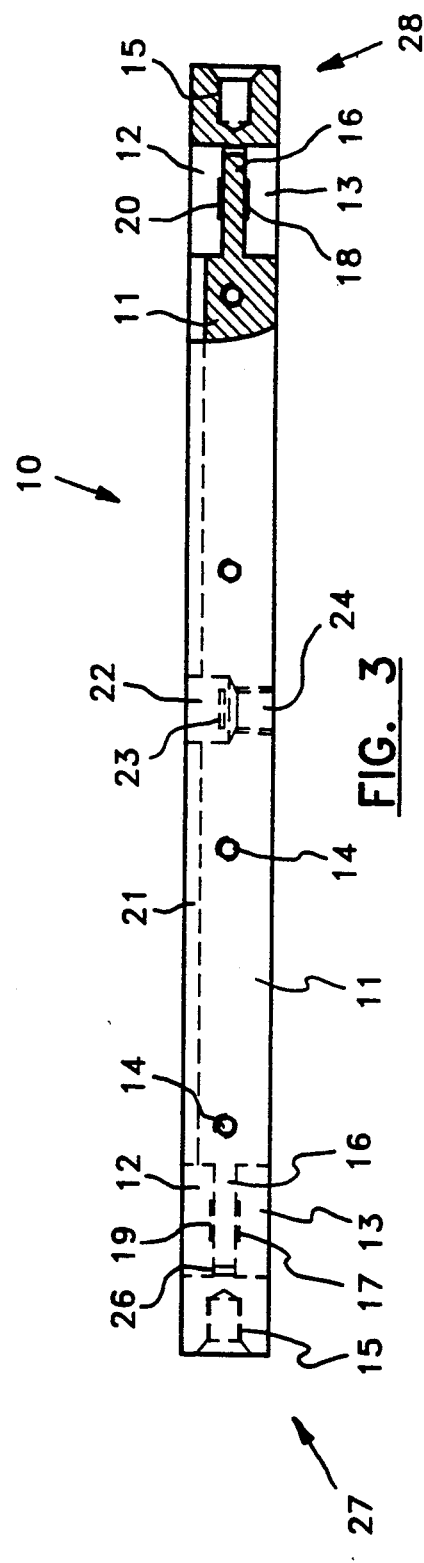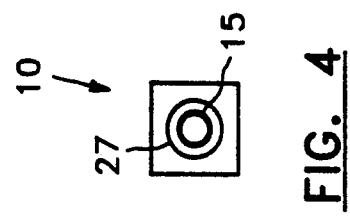

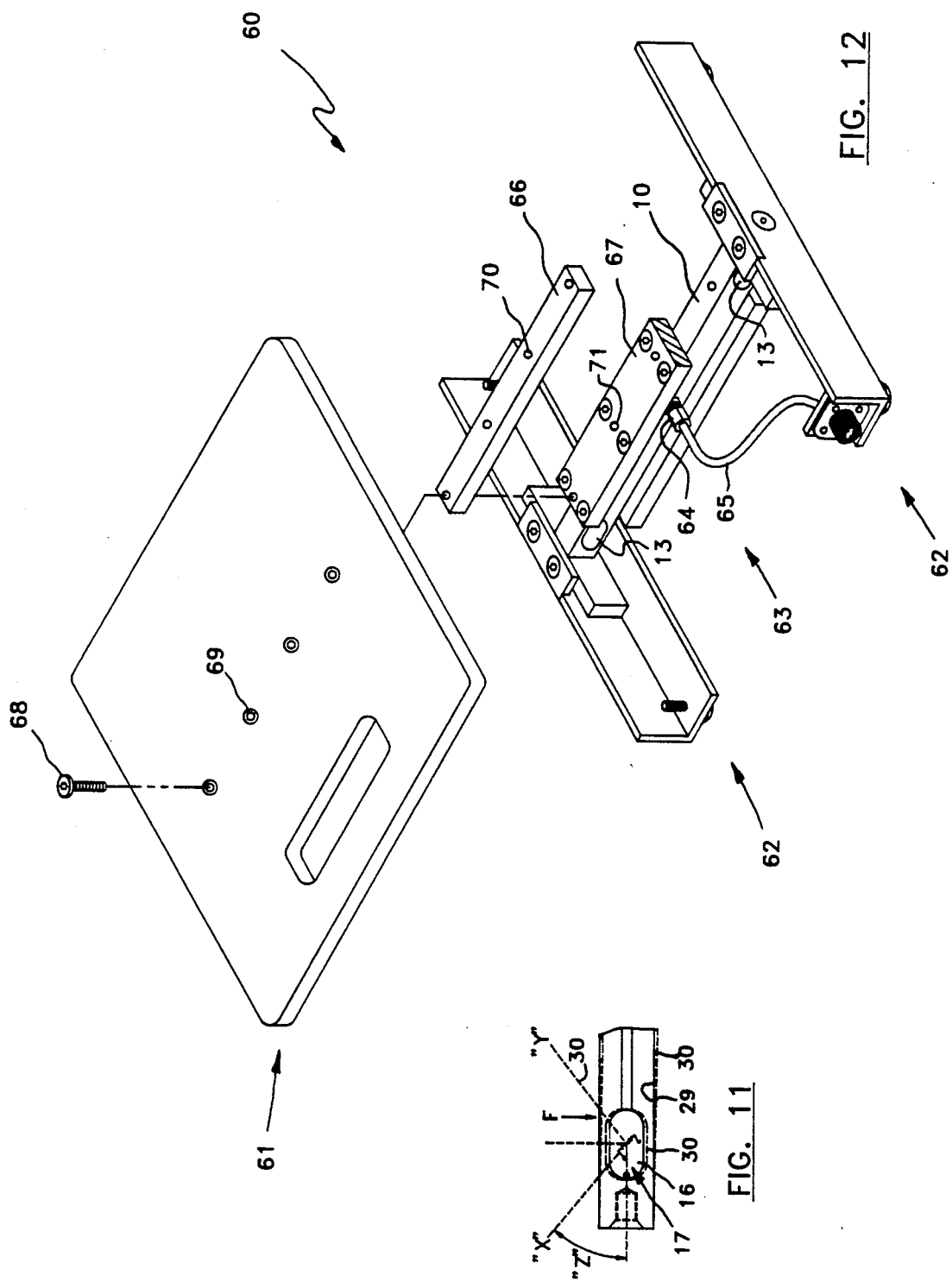

FORCE MEASUREMENT ASSEMBLY

BACKGROUND OF INVENTION

This invention relates generally to force measurement assemblies and particularly to load cell assemblies used in portable, low profile weighing scale assemblies.

Applicants, Kroll et al. have in the past disclosed load cell structures in U.S. Pat. Nos. 4,775,018 and 4,813,504 issued on Oct. 4, 1988 and Mar. 21, 1989, respectively.

Applicants' above referenced Load Cell Structures and associated Wheel Scale Assemblies are designed for relatively large, heavy vehicles, such as trucks. Accordingly, the assemblies are designed and constructed to handle weights up to 20,000 lbs and yield weighing accuracies in the range of plus or minus one percent.

The load cell structures of the present invention are for use in scale systems specifically designed for automobiles and particularly for racing cars. Accordingly, the load cell assemblies are designed for lower weight capacities, i.e. 1000-1500 lbs. per weighing pad and with a weighing accuracy of approximately plus or minus 0.5 percent.

Thus, it is the object of this invention to provide load cell assemblies for use as structural components in weighing scale assemblies for the race car industry and the like. The load cell structures are lightweight, low profile assemblies which are economical, easily manufactured and which yield reliable and repeatable weighing results with a high degree of accuracy. Although the need for such accurate and repeatable, low cost load cell structures has long existed in the industry, none in so far as is known has been proposed or developed.

SUMMARY OF THE INVENTION

The present invention provides a double ended shear beam load cell assembly for use as a structural weight bearing component for a portable low profile weighing scale. The load cell has an elongated rectilinear beam structure having opposing ends and a central top flat portion. A pair of axially aligned and laterally opposing apertures are positioned between each opposing end and the central portion of the beam and which define spacially parallel lateral end walls. Strain gauges are mounted to the lateral end walls in a predetermined orientation with respect to each other to cancel the effect of compressive and tensive forces as a result of beam twisting during use.

Top and bottom brace plate members are provided to secure the central portion of the load cell beam therebetween. A spacer plate is provided for mounting on the top brace plate and to receive a load platform of a weighing scale. The utilization of the top and bottom brace plate members provides for a stable load cell beam which yields a structure that provides reliable and repeatable measurements by reducing the effects of beam twisting.

The shear beam load cell assembly further has means to mount the load cell at its respective ends for securement in a weighing scale. Further provided by this invention are load cell configurations and compositions of materials which permit the use of economical, and relatively inexpensive components for the manufacture of portable, low profile weighing scales.

These and other benefits of this invention will become clear from the following description by reference to the drawings.

BRIEF DESCRIPTION OF THE DRAWINGS

FIG. 2 is a side view of the load cell assembly shown in FIG. 1;

FIG. 3 is a bottom view of the load cell assembly shown in FIG. 1;

FIG. 4 is an end view of the load cell assembly shown in FIG. 1;

FIG. 11 is a detailed side view of a strain gauge orientation on the load cell assembly; and FIG. 12 is a perspective view, partially exploded for clarity, of a wheel scale assembly which utilizes the load cell assembly shown in FIGS. 1-4.

DESCRIPTION OF THE PREFERRED EMBODIMENT

Figure 1:
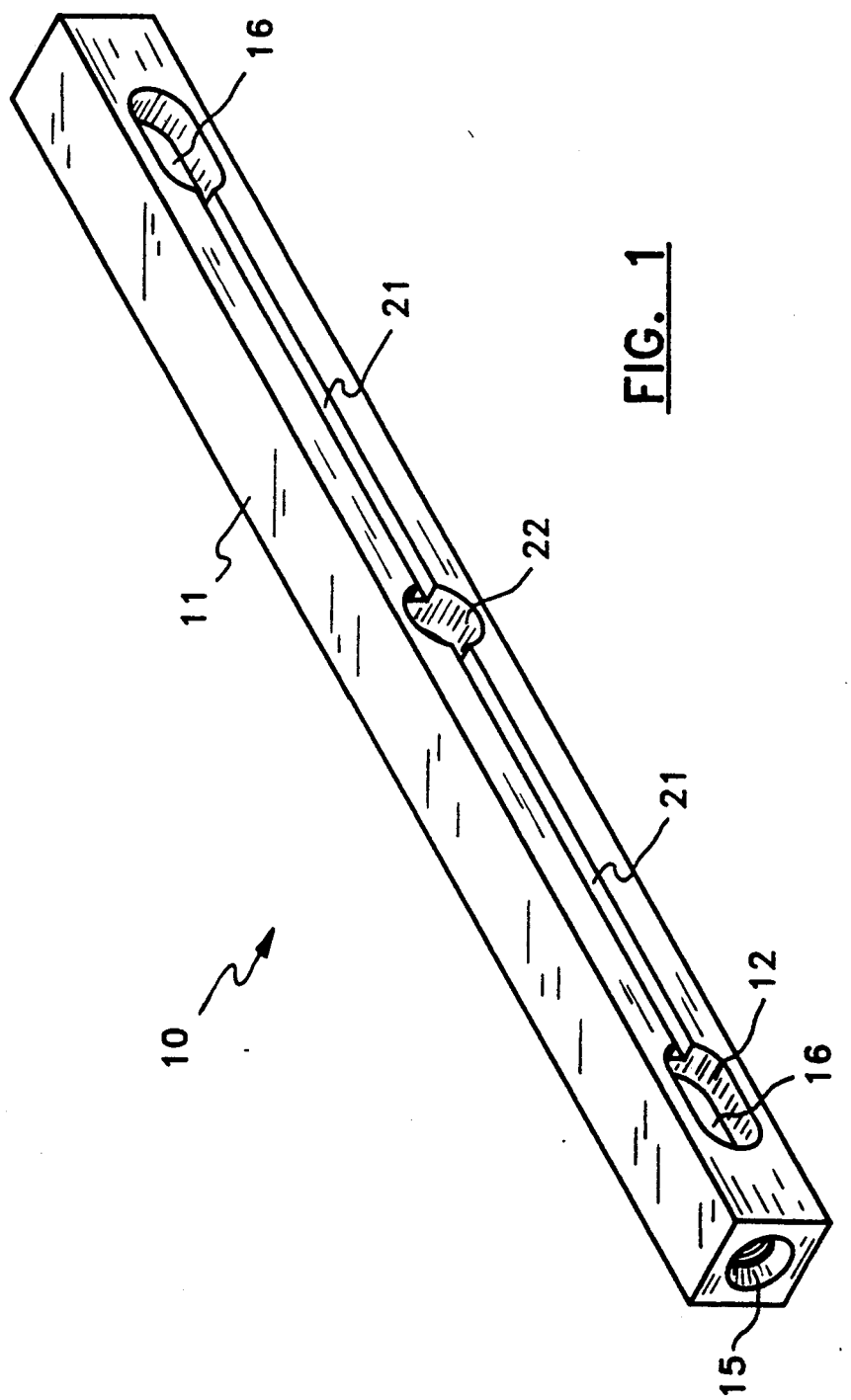
FIG. 1 is a perspective view of the load cell assembly of the present invention.

The load cell assembly according to the present invention provides a lightweight, unitary and compact electronic means for measuring a load or other force, for weighing or other applications. When used in conjunction with cooperating scale assembly structures, the load cell assemblies provided hereby may be utilized for weighing loads of approximately 1000-1500 lbs. (455-682 kg.) with an accuracy of plus or minus 0.5 percent. The load cell assemblies are water resistant, moisture resistant, and dirt resistant, and therefor may be used under a variety of environmental conditions and in a temperature range of approximately 32-122 degrees Fahrenheit (0-50 degrees Celsius).

The load cell assemblies of the present invention are particularly useful in constructing low profile, light weight electronic scales or weigh pads for use in scale systems used for example in weighing automobiles or the like.

Referring to FIGS. 2-4, the load cell 10 is a double ended shear beam type load cell mechanism which utilizes strain gauges to measure the weight of a load applied to the load cell 10. The load cell assembly 10 of the present invention has a substantially square cross-sectional configuration with an elongated body structure 11 and opposing ends 31 and 32. The load cell 10 is shown to have a threaded aperture 15 axially located at each of its ends 31 and 32 which provides securement of the load cell 10 to the base structure of a scale assembly. The load cell 10 further has a plurality of top threaded apertures 14 for connection with the platform of the scale assembly. Adjacent each end 31 and 32, gauging recesses 12 and 13 of a generally circular configuration are located in opposing vertical side walls of the load cell 10 such that a longitudinally extending and vertically oriented stress isolation member 16 is formed between the opposing recesses 12 and 13.

The depth of the gauging recesses 12 and 13, and the resultant width or thickness of the stress isolation members 16 is selected to correspond with a narrow center beam region coextensive throughout the entire load cell 10. It has been found that under a typical load situation, the load cell 10 experiences twisting forces from side to side or transverse its body structure 11. These twisting forces generate compression on one side of the body 11 and corresponding tension on the opposite side. Such compressive and tensive forces frequently alternate under a load, for example due to movement of the scale or of the object being weighed. Also, these forces are at a minimum in the center or neutral axis of the load cell body and at a maximum proximate the sides. Therefore, the ideal location for measurement of shear forces (due to the load) with minimum compression and tension is at the neutral axis of the center beam region. The stress isolation member 16 minimum thickness allows strain gauge means to be placed as closely as possible to the neutral axis of the center beam, while maintaining the strength of the overall structure to prevent over bending or breaking.

Four (4) strain gauges 17-20 are shown disposed and mounted in a predetermined orientation on the respective face or surfaces of the stress isolation members 16. Each strain gauge 17-20 has a pair of conductors or wires 25 which extend for connection to a communications cable 65 at a compression fitting 64. A wiring aperture 26 is disposed in each stress isolation member 16 to allow passage therethrough of the conductors 25 of the strain gauges 17 and 18 located on one side of the load cell 10. A wiring slot 21 is generally centrally and longitudinally disposed in the opposing side of the load cell 10 to house the conductors of all the strain gauges 17-20 as they extend to a wiring bore 22 which is centrally disposed at the approximate midpoint of the load cell 10. The slot 21 depth is selected to fully enclose the strain gauge wiring 25 and also to minimize reduction in structural integrity of the load cell body 11. To the extent that the load cell body 11 is unbalanced by the slot 21, a brace structure may be utilized, as will be further discussed, to compensate for any loss and stabilize the overall structure. The wiring bore 22 extends through the slot 21 side of the load cell 10 to merge with threaded aperture 24, and to thereby permit connection between the strain gauge conductors 25 and the communications cable 65 A water-proof sealant is preferably injected into the slot 21 and bore 22 to provide an environmental barrier. The load cell body 11 is preferably constructed of an extruded high strength aluminum alloy such as 2024 T351 aluminum.

The strain gauges 17-20 measure dimensional changes within the load cell body 11 caused by a load. The operation of the strain gauges 17-20 preferably used herein is based on the principle that the electrical resistance of a conductor changes when subjected to mechanical deformation due to weight being placed on the load cell 10. As the strain gauge 17-20 is stretched elastically, due to disfiguration of the stress isolation areas 16 to which they are attached, its length and diameter are altered, resulting in a change in its electrical resistance. This resistance change is measured in accordance with Poisson's ratio to yield a weight value proportional to the load applied to the load cell 10.

Referring also to FIG. 11, a bonded strain gauge is preferably utilized, although wire, foil and semi-conductor type strain gauges may be used consistent with the teachings of this invention. The bonded strain gauge consists of the lead wires 25 and active resistance wires 33 which are mounted on a carrier sheet 34. For maximum performance, the active resistance wires 33 are mounted, preferably via an insulating cement such as epoxy with an acrylic outer coating, very closely to the gauging surface of the stress isolation member 16 under no load conditions. The gauging recesses 12 and 13 may be sealed with polyurethane, for example, to provide a fully sealed load cell structure 10.

The strain gauges 17-20 are preferably oriented or gauged so that the load cell 10 yields accurate weighing irrespective of the exact location of the wheel or other load relative to the platform top surface, for example, due to uneven load placement or scale tilting. As shown, the strain gauges 19 and 20 on one side of the load cell 10 are located in a spacially parallel configuration, each at a forty five (45) degree angle with respect to the horizontal plane of the load cell 10. The strain gauges 17 and 18 on the opposite side of the load cell 10 are similarly positioned parallel to each other on the stress isolation member 16 walls, but are further aligned so as to be spacially perpendicular to the orientation of strain gauges 19 and 20. In this configuration, compressive and tensive forces exerted on the load cell 10 by the load are balanced; the uneven load effects being cancelled. Thus, accurate and reproducible electrical responses are achieved notwithstanding uneven load conditions.

All four strain gauges 17-20 are electrically connected to a circular connecting plate assembly 23 in the central wiring bore 22. As is known in the art, the gauges 17-20 are connected to a wheatstone bridge located on the plate 23 for calibration of the load cell 10 The connecting plate assembly 23 is connected to the interconnect wiring 65 via the compression fitting 64 disposed in threaded aperture 24, disposed in the side of the load cell 10. The cable 65 provides electrical communication between the load cell 10 and control module means.

The size and spacial positioning of the stress isolation members 16 in the load cell body 11, including the specific separation distances between members 16 and the distance between each member 16 and the load cell ends 31 and 32 is a function of the strain gauge 17-20 orientation. As shown in FIG. 2, the horizontal "X" and vertical "Y" axis of the left strain gauge 19 are shown to intersect with vertical planes marking the longitudinal ends of the stress isolation member 16. A central load bearing area "A" is formed in the load cell body 11 between the two stress isolation areas 16 and which is coextensive with the load concentrating lengths of the scale platform means. Correspondingly, support of the load cell body 11 occurs outside each stress isolation area 16, within the load cell end regions 31 and 32. It has been found that this structural configuration in cooperation with the above-mentioned gauging compensation minimizes the effects of any twisting forces on weighing accuracy.

Figure 5:
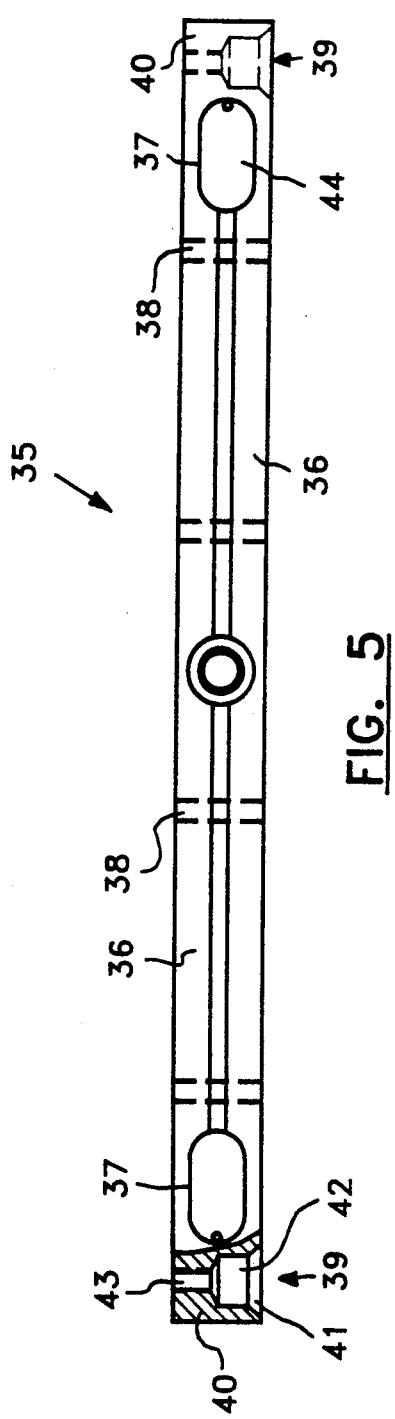
FIG. 5 is a side view of an alternative embodiment of the load cell assembly of the present invention.
Figure 6:
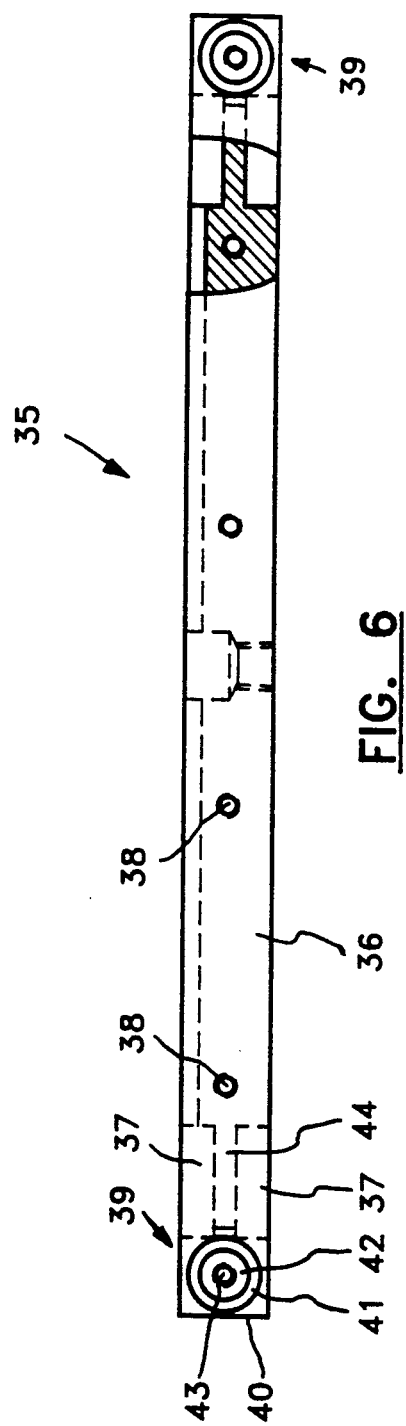
FIG. 6 is a bottom view of the load cell assembly shown in FIG. 5.
Figure 7:
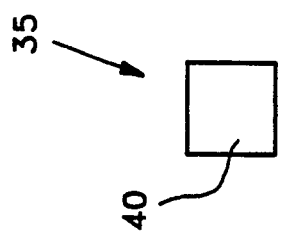
FIG. 7 is an end view of the load cell assembly shown in FIG. 5.

An alternative embodiment of the load cell assembly is shown in FIG. 5-7. The load cell assembly 35 has a body structure 36 also of an elongated and generally square cross-sectional configuration. Adjacent its ends 40, gauging recesses 37 are disposed in opposing vertical side walls of the load cells body 36 to form longitudinally extending and vertically oriented axial stress isolation members 44.

The load cell 35 has a plurality of vertical threaded apertures 38 for connection with the platform of a scale assembly. The load cell further has a base connection aperture 39 vertically disposed at each of its ends 40. The base connection apertures 39 have a threaded aperture 43, a recess 42 and a bevel 41.

Generally this load cell structure 35 is useable in a weigh scale assembly wherein a pair of load cells 35 are disposed below a scale platform, for example at opposing peripheral edges thereof. The base connection apertures 39 permit connection of foot members (not shown) directly to the load cell bottom ends.

Figure 8:
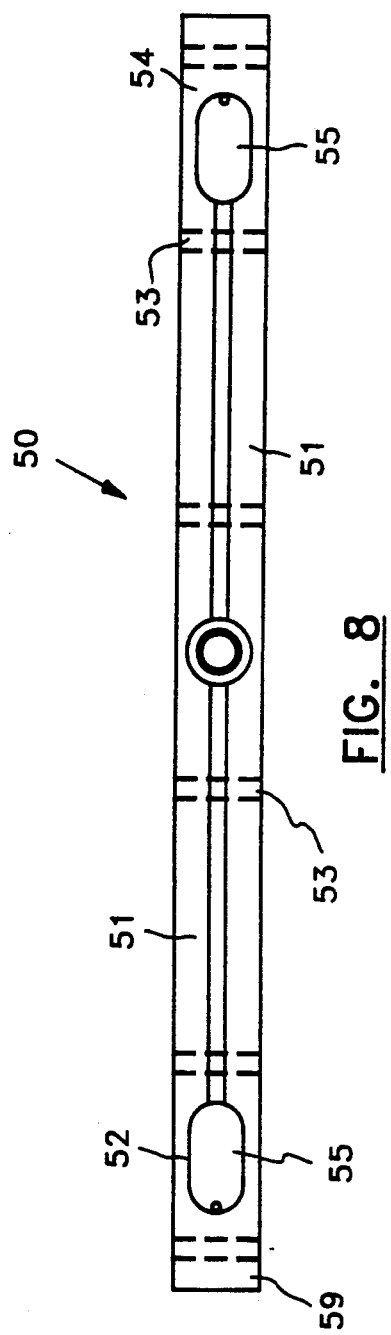
FIG. 8 is a side view of an alternative embodiment of the load cell assembly of the present invention.
Figure 10:
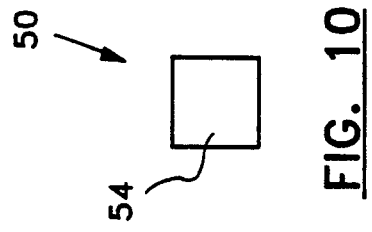
FIG. 10 is an end view of the load cell assembly shown in FIG. 8.
Figure 9:
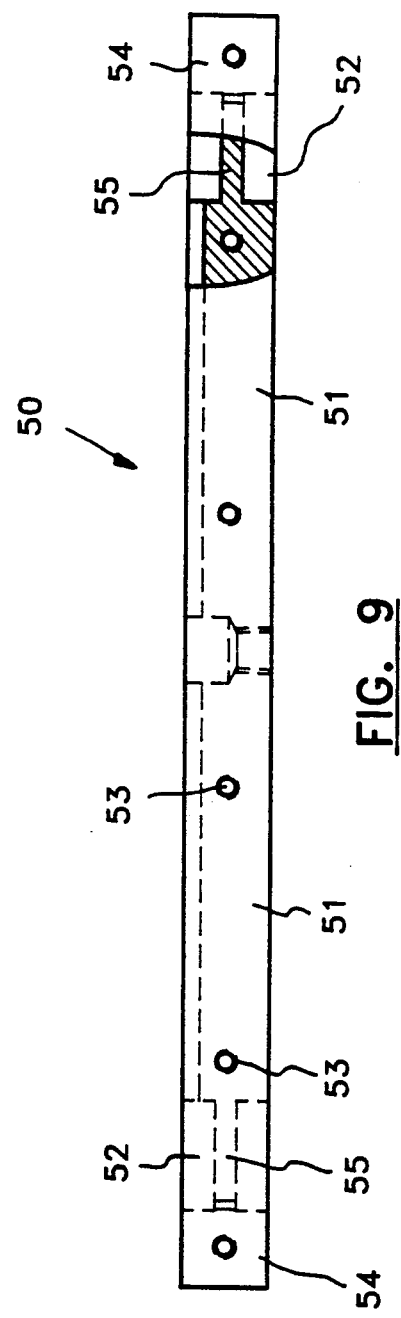
FIG. 9 is a bottom view of the load cell assembly shown in FIG. 8.
Figure 13:
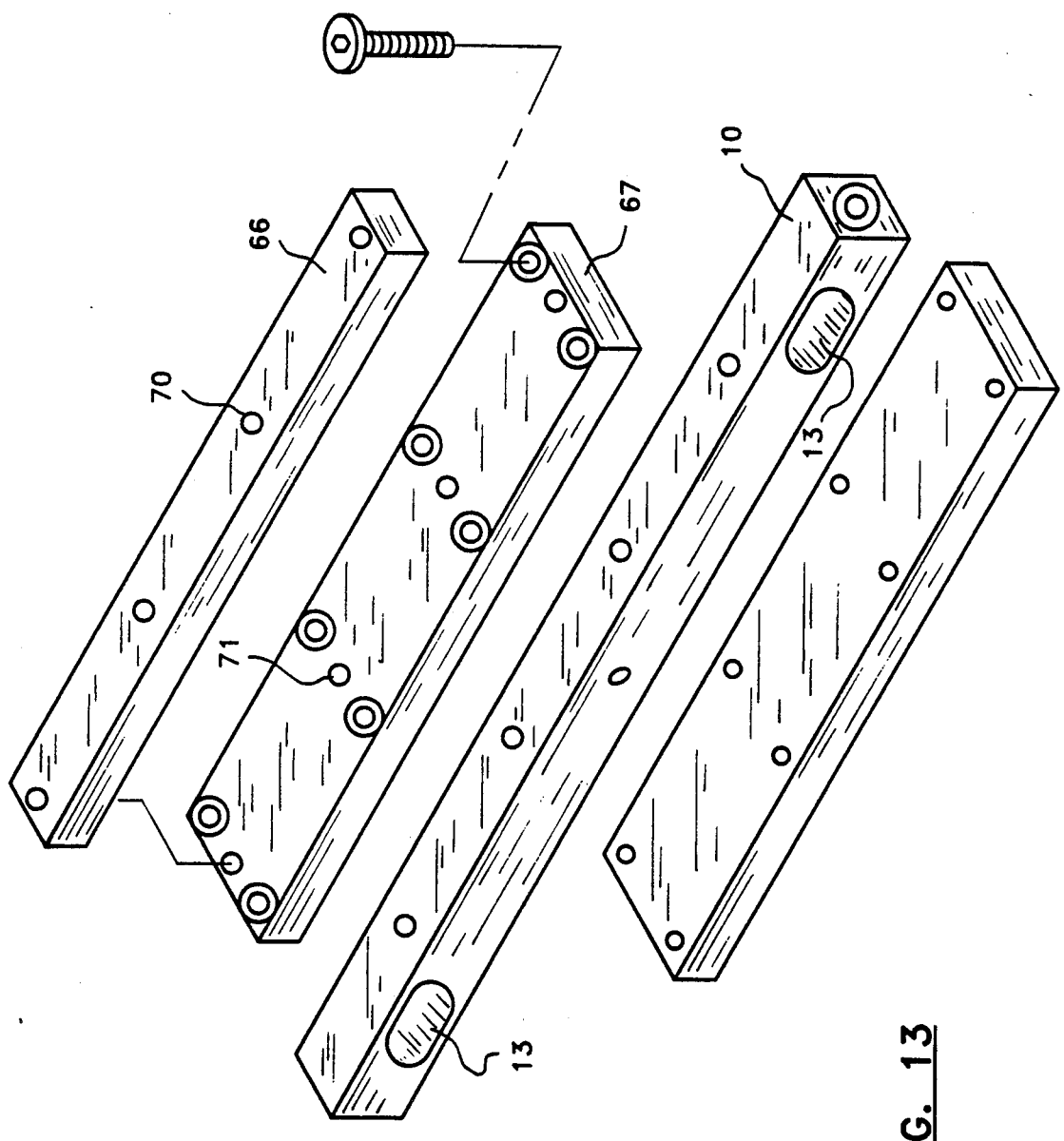
FIG. 13 is a perspective view of the load cell with the spacer and top brace.

FIGS. 8-10 show yet another embodiment of the load cell assembly. The load cell assembly 50 has a body structure 51 also of an elongated and square configuration. Adjacent its ends 54, gauging recesses 52 are disposed in opposing vertical side walls of the load cell body 51 to form stress isolation members 55.

This load cell 50 further has a plurality of threaded vertical apertures 53 for connection with the platform of a scale assembly. As shown, four (4) apertures 53 are spaced at predetermined intervals along the load cell body 51, between the stress isolation members 55. Also, a single aperture 53 is disposed at each end 54 of the load cell.

The load cell embodiments 10, 35 and 50 discussed above are suitably utilized in an electronic weighing system, for example, a wheel scale assembly for use in weighing automobiles. Referring to FIG. 12, the wheel scale system comprises at least one scale or weigh pad unit 60 and a control/indicator unit or module (not shown) which are communicatively connected to each other via a plurality of wire conductors or a cable. In a preferred embodiment of the wheel scale system, four (4) scales 60 are communicatively connected to the control unit. The scales 60 may be placed under the wheels of an automobile to enable the system to measure the total weight of that automobile, for example, one used in the sport of automobile racing. The proportion of the total weight contributed by each weigh pad 60 may also be measured. Such information regarding the proportional weight associated at each quadrant or wheel of the automobile may be useful in properly balancing the weight distribution of that automobile. However, one or any number of individual weigh pads 60 may be utilized for various weighing applications. Also, utilizing various electronic circuitry and methods known in the art, additional information pertaining to the weighed subject matter may be detected, stored and analyzed.

Utilizing the teachings of this invention, lightweight, low profile and hand transportable weigh pads 60 may be provided with a total weight each of approximately 17 pounds (8 kg.), and with exterior dimensions of approximately 15 inches (39 cm.) in length and width, and 3 inches (8 cm.) in height.

The scale unit 60 is shown to comprise, basically, a top platform 61, a pair of bottom, spacially parallel legs or base members 62, and a load cell structure 63 which is mounted to and between the legs 62 and further to the platform 61. The generally square platform 61 has a top surface area which is sufficient to support the object to be weighed by the scale 60, for example, one wheel or tire of an automobile. The base members 62 are elongated and have a length equivalent to that of one side of the platform 61. In their operative configuration, the base members 62 are disposed below opposing peripheral edges of the platform 61. The vertical and horizontal dimensions of the base members 62 are selected to provide a stable, sturdy and low profile scale 60. The load cell structure 63 is the primary load bearing component of the scale 60. As shown, it is centrally located below the platform 61, and extends perpendicularly between the two leg members 62, at approximately their midpoints. The height or thickness of the load cell structure 63 is slightly less than that of the leg members 62. In the instant example, the automobile tire or load is preferably aligned, and centered along the apertures shown on the platform 61 so as to be correspondingly oriented in line with the load cell structure 63.

The load cell structure 63 elements cooperate with the platform 61 and base members 62 permit free vertical movement with resulting shear deformation of the elevated double ended beam structure of the load cell element 10 of the overall load cells structure 63. Thus, as a force or load is placed on the platform 61, it is transferred to the load cell 10 via a spacer 66 and the top brace 67. In particular, the spacer 66 functions to concentrate the load applied over the relatively large surface area of the platform 61 to the longitudinal axis or center beam of the load cell 10. Thus, the width of the spacer 66 is equivalent to that of the load cell 10. The length of the spacer 66 is equivalent to predetermined center load area on the load cell 10, described above. Braces 67 and 72 function to stabilize the structure of the load cell 10. As described above, the load cell 10 is subject to a transverse, vertical spreading force under a load condition. However, the top and bottom braces 67 and 72 provide a counter-acting and transverse compressive force, via cap screws 73 to stabilize the load cell and prevent vertical spreading. The tension provided by screws 73 on each side of the load cell 10 may be adjusted to vary and balance the compressive forces, and thereby increase the performance and accuracy of weighing. The horizontal dimensions of the braces 67 and 72 are selected to provide the above mentioned stabilization function and to transfer platform 61 load (via spacer 66) to the center load area of the load cell 10. It ha been found that the utilization of the brace structure 67 and 72 yields, in effect, a structure which functions as a relatively larger load cell without added weight or size. Thus, the stabilization which results from the bracing structure enables the load cell 10 to be used singly and for larger loads.

As many changes are possible to the embodiments of this invention, utilizing the teachings thereof, the description above and the accompanying drawings should be viewed in the illustrative and not in the limited sense.

We claim:

1. A double ended shear beam load cell assembly constructed and arranged to provide a structural weight bearing member of a low profile weighing scale assembly comprising:

(a) an elongated aluminum beam structure having a generally rectilinear body of a predetermined length and width and having a longitudinal axis therethrough, said beam having opposing ends and a central flat top portion;

(b) a pair of axially aligned and laterally opposing apertures positioned between said opposing ends and said central top portion, each said opposing apertures having spacially parallel lateral end walls in said beam structure with respect to said longitudinal axis;

(c) strain gauge means mounted to said aperture parallel end walls and being mounted in a predetermined orientation with respect to each other;

(d) mounting means at each said opposing beam end; and (e) top brace and bottom brace plate members mounted to said central portion of said beam structure and having at least two aligned peripheral apertures and fastening means to secure said beam structure between said plate members.

2. The load cell assembly of claim 1, wherein said strain gauge means are mounted in a predetermined parallel and opposing arrangement on said lateral end walls.

3. The load cell assembly of claim 2, wherein said oppositely disposed strain gauge means are mounted at perpendicular forty five degree angles with respect to said longitudinal axis.

4. The load cell assembly of claim 1, wherein a centrally disposed aperture is provided through one wall of said beam structure for providing external communication with said strain gauge means.

5. The load cell assembly of claim 1, wherein a spacer plate is mounted to the top of said beam structure at said central portion and between said pair of axially aligned apertures.

6. The load cell assembly of claim 1, wherein a support saddle member and a support strap is attached to each opposing end of said beam structure.

7. The load cell assembly of claim 1, wherein an adjustable leg structure is mounted to each end of said beam structure.

8. The load cell assembly of claim 1, wherein said mounting means is comprised of a threaded aperture in each said beam structure end.

9. An electronic load measuring apparatus, comprising:

(a) a solid, elongated body structure having opposing ends and at least one pair of opposing sides;

(b) at least one pair of recesses located at predetermined locations adjacent each said body structure end, said recesses of each said pairs of recesses being coaxial with one another and aligned opposite one another in said body structure sides;

(c) a beam member formed between each said pair of recesses and having predetermined face areas open to said recesses, said beam members being oriented along a central axis along the length of said body structure;

(d) electronic strain detection means mounted to each said beam member face area and being mounted with respect to each other in a predetermined orientation; and (e) a top brace and a bottom brace plate member mounted to said body structure, and having at least two aligned peripheral apertures and fastening means to secure said body structure between said plate members.

10. The load measuring apparatus of claim 9, wherein said strain detection mean are mounted in a predetermined parallel and opposing arrangement on said beam member face areas.

11. The load measuring apparatus of claim 10, wherein aid oppositely disposed strain detection means are mounted at perpendicular forty five degree angles with respect to said central axis.

12. The load measuring apparatus of claim 9, wherein said body structure has mounting means comprised of a threaded aperture in each said body structure end.

13. The load measuring apparatus of claim 9, wherein a centrally disposed aperture is provided through one wall of said body structure for providing external communication with sad strain detection means.

14. The load measuring apparatus of claim 9, wherein an adjustable leg structure is mounted to each end of said body structure.

* * * * *